United States Patent
Mital et al.

(10) Patent No.: US 9,864,633 B2
(45) Date of Patent: *Jan. 9, 2018

(54) NETWORK PROCESSOR HAVING MULTICASTING PROTOCOL

(71) Applicant: Intel Corporation, Santa Clara, CA (US)

(72) Inventors: Deepak Mital, Orefield, PA (US);
Joseph A. Manzella, Macungie, PA (US); Ritchie J. Peachey, Whitehall, PA (US); William Burroughs, Macungie, PA (US)

(73) Assignee: Intel Corporation, Santa Clara, CA (US)

(*) Notice: Subject to any disclaimer, the term of this patent is extended or adjusted under 35 U.S.C. 154(b) by 165 days.

This patent is subject to a terminal disclaimer.

(21) Appl. No.: 14/810,039

(22) Filed: Jul. 27, 2015

(65) Prior Publication Data

US 2015/0331718 A1    Nov. 19, 2015

Related U.S. Application Data

(63) Continuation of application No. 13/795,579, filed on Mar. 12, 2013, now Pat. No. 9,094,219.

(60) Provisional application No. 61/774,646, filed on Mar. 8, 2013.

(51) Int. Cl.
| | |
|---|---|
| *H04L 12/28* | (2006.01) |
| *G06F 9/48* | (2006.01) |
| *H04L 12/18* | (2006.01) |
| *G06F 13/10* | (2006.01) |

(52) U.S. Cl.
CPC .......... *G06F 9/4881* (2013.01); *G06F 13/102* (2013.01); *H04L 12/18* (2013.01); *H04L 12/1886* (2013.01)

(58) Field of Classification Search
CPC ........................................ H04L 12/18
See application file for complete search history.

(56) References Cited

U.S. PATENT DOCUMENTS

| | | | | |
|---|---|---|---|---|
| 6,895,481 B1* | 5/2005 | Mitten | ............... | H04L 12/1854 370/498 |
| 7,292,529 B1* | 11/2007 | Basu | .................. | H04L 12/1886 370/230 |
| 9,094,219 B2* | 7/2015 | Mital | ..................... | H04L 12/18 |
| 2012/0131283 A1* | 5/2012 | Mital | ................... | G06F 12/084 711/144 |

* cited by examiner

*Primary Examiner* — Kevin C Harper
(74) *Attorney, Agent, or Firm* — Barnes & Thornburg LLP

(57) ABSTRACT

An network processor is described that is configured to multicast multiple data packets to one or more engines. In one or more implementations, the network processor includes an input/output adapter configured to parse a plurality of tasks. The input/output adapter includes a multicast module configured to determine a reference count value based upon a maximum multicast value of the plurality of tasks. The input/output adapter is also configured to set a reference count decrement value within the control data portion of the plurality of tasks. The reference count decrement value is based upon the maximum multicast value. The input/output adapter is also configured to decrement the reference count value by a corresponding reference count decrement value upon receiving an indication from an engine.

20 Claims, 4 Drawing Sheets

NETWORK PROCESSOR HAVING MULTICASTING PROTOCOL

CROSS-REFERENCE TO RELATED APPLICATION

The present application is a continuation application of U.S. application Ser. No. 13/795,579, entitled "NETWORK PROCESSOR HAVING MULTICASTING PROTOCOL," which was filed on Feb. 12, 2013 and claimed the benefit under 35 U.S.C. §119(e) of U.S. Provisional Application Ser. No. 61/774,646, entitled NETWORK PROCESSOR HAVING MULTICASTING PROTOCOL, which was filed on Mar. 8, 2013.

FIELD OF THE INVENTION

The present invention is directed to a network processor, and more particularly to a network processor having multicasting capabilities.

BACKGROUND

Network processors are generally used for analyzing and processing data packets for routing and switching packets in a variety of applications, such as network surveillance, video transmission, protocol conversion, voice processing, and internet traffic routing. A network processor in a switching network may provide transport of received data packets from an input port to one (unicast) or more (multicast) output ports of the network. Some network switches provide multicasting by replicating packets at the output port(s) corresponding to the received packet. Multicast packets may be replicated as many times as the number of output ports to which the multicast packet is transmitted.

SUMMARY

An network processor is described that is configured to multicast multiple data packets to one or more engines. In one or more implementations, the network processor includes an input/output adapter configured to parse a plurality of tasks (e.g., a set of data packet copies). The input/output adapter includes a multicast module configured to determine a reference count value based upon a maximum multicast value of the plurality of tasks. The input/output adapter is also configured to set a reference count decrement value within the control data portion of the plurality of tasks. The reference count decrement value is based upon the maximum multicast value. The input/output adapter is also configured to decrement the reference count value by a corresponding reference count decrement value upon receiving an indication from an engine. The indication includes the reference decrement count value represents that the respective engine has completed operations on at least one of the plurality of tasks.

This Summary is provided to introduce a selection of concepts in a simplified form that are further described below in the Written Description. This Summary is not intended to identify key features or essential features of the claimed subject matter, nor is it intended to be used as an aid in determining the scope of the claimed subject matter.

BRIEF DESCRIPTION OF THE FIGURES

The Written Description is described with reference to the accompanying figures. The use of the same reference numbers in different instances in the description and the figures may indicate similar or identical items.

WRITTEN DESCRIPTION

Figure 1:
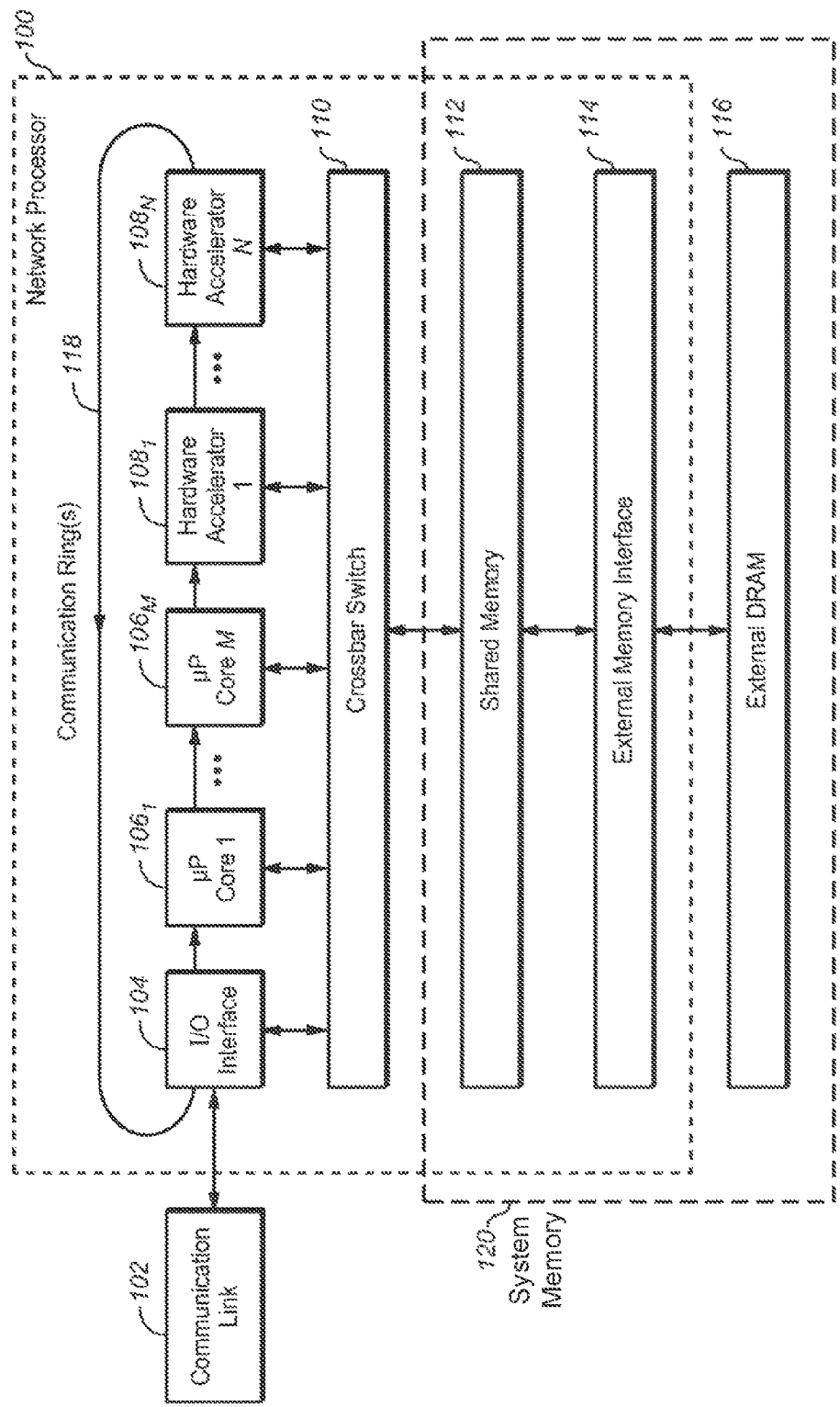
FIG. 1 is a block diagram of a network processor in accordance with an example implementation of the present disclosure.

FIG. 1 shows a block diagram of a network processor 100 implemented as a system-on-chip (SoC) in accordance with the present disclosure. The network processor 100 is configured to be utilized for processing data packets, performing protocol conversion, encrypting and decrypting data packets, or the like. As shown in FIG. 1, network processor 100 includes one or more input-output (I/O) interfaces collectively shown as I/O interface 104, one or more microprocessor (µP) cores 106(1) through 106(M), one or more hardware accelerators 108(1) through 108(N), and on-chip shared memory 112. As used herein, M, N, and P are integers greater than or equal to one (1). The network processor 100 also includes an external memory interface 114 for communication with an external memory 116. The external memory 116 is typically implemented as dynamic random-access memory (DRAM), such as a double-data-rate three (DDR-3) DRAM, for off-chip storage of data. In some embodiments, such as shown in FIG. 1, each of the one or more I/O interfaces 104, µP cores 106(1) through 106(M), and hardware accelerators 108(1) through 108(N), are communicatively connected through switch 110 to shared memory 112. In a specific embodiment, the switch 110 comprises a non-blocking crossbar switch.

The I/O interface 104 is typically implemented as hardware that connects the network processor 100 to one or more external devices through an I/O communication link 102. The I/O communication link 102 may be employed for communication with one or more external devices, such as a computer system or networking device, that interface with the network processor 100. The I/O communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other suitable interface link. Received data packets may be placed in a buffer in a shared memory 112 by transfer between the I/O interface 104 and the shared memory 112 through the switch 110.

In embodiments of the present disclosure, the shared memory 112 comprises memory operating as cache that can be allocated and/or subdivided. For example, the shared memory 112 can include one or more sub-caches that are dynamically allocated to the various the μP cores 106 and the hardware accelerators 108. The external memory interface 114 couples the shared memory 112 to one or more external memories, shown as external memory 116, to provide off-chip storage of data not currently in use by the various μP cores 106 and the hardware accelerators 108 to free space in shared memory 112. As indicated by dashed line 120 of FIG. 1, the shared memory 112 and the external memory 116 is referred to as system memory 120. Generally, the system memory 120 is addressed as a single address space such that various accelerators 108 can request data whether the data is stored in the shared memory 112 or the external memory 116.

The hardware accelerators 108 are configured to communicate with each other, for example, by one or more communication bus rings 118 that pass data messages, or instructions, (e.g., "tasks") from a source core to a destination core. The tasks allow the network processor 100 to process a wide variety of data and control messages more efficiently than with a fixed pipeline or non-pipelined architecture. As discussed in more detail below, the sequence of processing of the tasks depends on i) the type of packet and ii) the type of processing performed by the various cores on a particular packet (or group of packets), control message, or other data. This is referred to herein as a "Virtual Pipeline™", a trademark of LSI Corporation, of Milpitas, Calif. In embodiments of the present disclosure, each of a plurality of virtual pipelines operate by each processing module of network processor 100 receiving a task, executing that task, and assigning a subsequent task to another (or the same) processing module depending on an identification of a virtual pipeline corresponding to the task. As described herein, tasks are instructions to the destination core to perform certain functions.

The network processor 100 is configured to receive data packets from one or more source devices, perform processing operations for the received data packets, and transmit data packets out to one or more destination devices. As shown in FIG. 1, one or more data packets are transmitted from a transmitting device to the network processor 100 via the I/O communication link 102. The network processor 100 is configured to receive data packets from one or more active data streams concurrently from the I/O communication link 102. The I/O interface 104 is configured to parse the received data packet and provide the received data packet, via switch 110, to a buffer in the shared memory 112.

The I/O interface 104 provides various types of I/O interface functions and, in one or more embodiments described herein, is a command-driven hardware accelerator that connects the network processor 100 to one or more external devices. The received packets may be stored in shared memory 112 and then one or more corresponding tasks are generated. The transmitted packets are generated from data in the shared memory 112 for one or more corresponding tasks and can be transmitted out of the network processor 100. In an embodiment of the present disclosure, the I/O interfaces include Ethernet I/O adapters configured to provide integrity checks of incoming data. The I/O adapters can also provide timestamp data for received and transmitted packets that might be used to implement features such as timing over packet (e.g., specified in the standard recommendations of IEEE 1588). In another embodiment of the present disclosure, the I/O interface 104 is implemented as input (receive) only or output (transmit) only interfaces. In one or more implementations of the present disclosure, the Ethernet I/O adapters may comprise one or more engines, such as the engines 302 (see FIG. 3) described in greater detail below.

The various μP cores 106 and the hardware accelerators 108 of the network processor 100 include several one or more types of processors or accelerators. For example, the various μP cores 106 may be implemented as Pentium® or Power PC® processors, or a combination of different processor types (Pentium® is a registered trademark of Intel Corporation, and Power PC® is a registered trademark of IBM). The various hardware accelerators 108 might include, for example, one or more function• specific modules, such as a Modular Packet Processor (MPP), a Packet Assembly Block (PAB), a Modular Traffic Manager (MTM), a Memory Management Block (MMB), a Stream Editor (SED), a Security Protocol Processor (SPP), a Regular Expression (RegEx) engine, and other special-purpose modules.

The MTM is a software-driven accelerator that provides packet scheduling and possibly up to six levels of scheduling hierarchy. The MTM might support millions of queues and schedulers (enabling per flow queuing if desired). The MTM might provide support for shaping and scheduling with smooth deficit weighed round robin (SDWRR) for every queue and scheduler. The MTM might also support multicasting. Each copy of a packet is scheduled independently and traverses down one or more virtual pipelines enabling multicast with independent encapsulations or any other processing. The MTM might also contain a special purpose processor that can be used for fine-grained control of scheduling decisions. The MTM might be used to make discard decisions as well as scheduling and shaping decisions.

The SED is a software-driven accelerator that allows for editing of packets. The SED performs packet editing functions that might include adding and modifying packet headers as well as fragmenting or segmenting data (e.g., IP fragmentation). The SED receives packet data as well as parameters from tasks and a task specified per-flow state. The output of the SED can become the outgoing packet data and can also update task parameters. The RegEx engine is a packet search engine for state-based cross-packet pattern matching. The RegEx engine is multi-threaded accelerator.

The SPP provides encryption/decryption capabilities and is a command-driven hardware accelerator, preferably having the flexibility to handle protocol variability and changing standards with the ability to add security protocols with firmware upgrades. The ciphers and integrity (hash) functions may be implemented in hardware. The SPP has a multiple ordered task queue mechanism, discussed in more detail below, that is employed for load balancing across the threads.

The PAB is a command driven hardware accelerator providing a holding buffer with packet assembly, transmit, retransmit, and delete capabilities. An incoming task to the PAB can specify to insert/extract data from anywhere in any assembly buffer. Gaps are supported in any buffer. Locations to insert and extract can be specified to the bit level. Exemplary traditional packet reassembly functions might be supported, such as IP defragmentation. The PAB is configured to also support generalized holding buffer and sliding window protocol transmit/retransmit buffering, providing an offload for features like TCP origination, termination, and normalization.

The MPP is a multi-threaded special purpose processor that provides tree based longest prefix and access control list classification. The MPP also has a hardware hash• based classification capability with full hardware management of hash-table additions, deletions, and collisions. Optionally associated with each hash entry is a timer that may be used under software control for tasks such as connection timeout and retransmission timing. The MPP contains a statistics and state management engine, which when combined with the hash table and timer facilities, provides support for state-based protocol processing. The MPP is configured to support millions of flows. The MPP architecture might be able to store all per thread states in memory instead of in register files.

The MMB allocates and frees memory resources in the shared memory 112. The shared memory 112 is allocated for such applications as task FIFO storage, packet data storage, hash-table collision handling, timer event management, and traffic manager queues. The MMB provides reference counts for each block of memory within the shared memory 112. The multiple reference counts allow for more efficient storage of information, such as multicast traffic (data to be sent to multiple destinations) or for retransmission. Multiple reference counts remove a need for replicating data each time the data is needed. The MMB preferably tracks the memory allocations using a stack-based approach since a memory block recently released is preferably the next block to be allocated for a particular task, reducing cache thrashing and cache tracking overhead. Blocks in the shared memory 112 may be dynamically allocated by the MMB to store data, and blocks might be available in various predetermined sizes. For example, the blocks might typically be in one of the following sizes: 256 bytes, 2048 bytes, 16384 bytes, and 65536 bytes. Additionally, the MMB is configured to maintain a list, in hardware (e.g., a stack structure), of at least substantially all buffers within the network processor 100. The MMB is configured to populate the stack structure with the buffers that are identified as free (e.g., a free list) and have a reference count (e.g., which is described in greater detail below) that is set to the initial value. In other words, allocation is the process of the MMB removing a buffer from the free list once an engine has requested the corresponding buffer, and deallocation is the process of the MMB placing a buffer back on the free list, as described in greater detail below.

Figure 2:
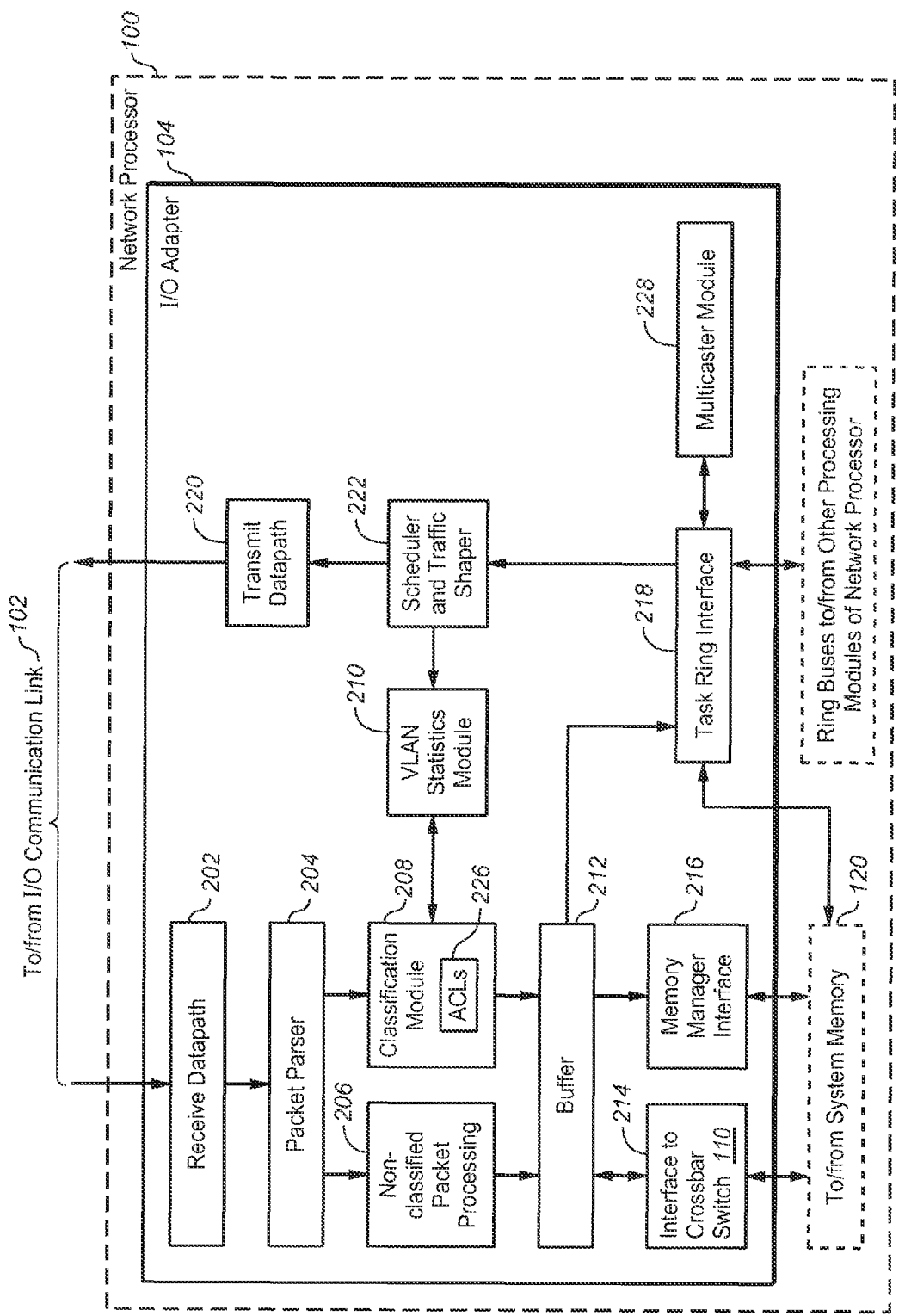
FIG. 2 is a block diagram of an input/output (I/O) adapter of the network processor shown in FIG. 1 in accordance with an example implementation of the present disclosure.

FIG. 2 illustrates a block diagram of I/O adapter (e.g., interface) 104 in accordance with embodiments of the present disclosure. As shown, an I/O interface 104 communicatively interfaces with the I/O communications link 102 via a receive datapath 202 and a transmit datapath 220. The receive datapath 202 is configured to provide data received from the communications link 102 to a packet parser 204 (e.g., a read engine). The packet parser 204 is configured to extract various data fields from one or more received packets. For example, the packet parser 204 is configured to extract OSI Layer 2, Layer 3, or Layer 4 fields from the received packets (e.g., MAC addresses, MPLS addresses, IP addresses, or TCP/UDP port addresses). The packet parser 204 is also configured to perform some verification of the received packet, such as verifying a CRC value or IPv4 checksum, or verifying that the packet is properly formed.

Some specialized packets might be provided to a non-classified packet processing module 206, which might generate and enqueue a task for processing within network processor 100 without further processing by I/O interface 104. For example, Ethernet "pause" packets, Ethernet "runt" packets, OSSP packets and ESMC packets might be provided to the module 206.

Received packets might be provided to a classification module 208. The classification module 208 includes one or more access control lists (ACLs) 226 and is configured to perform bridging, policing, and correlation for received packets. For example, the classification module 208 is configured to determine, via ACLs 226 or one or more bridging lists, one or more destinations corresponding to a received packet. For example, some embodiments of the present disclosure support MAC address bridging in accordance with IEEE 802.ID. Each ACL 226 may include one or more rules based on at least one of a virtual local area network (VLAN) corresponding to the packet and a port corresponding to the packet. The classification module 208 is also configured to check rate limits for corresponding VLANs and ports.

After processing by either the module 106 or the classification module 208, the received packet data may be stored in buffer 212 before being written, via the interface 214, to the system memory 120. One or more memory blocks in system memory 120 is allocated to store the received packet data based on a request sent to the MMB via a memory manager interface 216. The one or more tasks generated corresponding to the received packet is provided to subsequent processing modules of network processor 100 via a task ring interface 218. As shown in FIG. 2, I/O interface 104 might also have one or more additional communications interfaces, e.g., a clock signal, etc., with various modules of network processor 100, shown as other interfaces 224.

The VLAN statistics module 210 is configured to maintain one or more statistics for various VLANs of the network processor 100. The statistics may include, but are not limited to: the number of packets transmitted, a number of bytes transmitted, a number of packets received, and a number of bytes received for each VLAN of the network processor 100. The VLAN statistics module 210 is configured to receive input from the classification module 208 (e.g., corresponding to packets received by the network processor 100) and/or the scheduler and shaper 222 (e.g., corresponding to packets transmitted by the network processor 100) to track one or more statistics of each transmitted and received packet.

The I/O interface 104 receives tasks for transmission onto I/O communication link 102 via the task ring interface 218. The task ring interface 218 provides an address in system memory 120 of data to be transmitted to a scheduler and traffic shaper 222. The scheduler and traffic shaper 222 schedules packets for transmission by the I/O interface 104 onto a communication link 102. The scheduler and traffic shaper 222 is configured to modify packet traffic based on per-port credits, where the credits are based on packet size. A data packet for transmission is provided to the transmit datapath 220, which transmits the data packet to a destination via I/O communication link 102.

As shown in FIG. 2, the I/O adapter 104 includes a multicaster module 228 that receives multicast data packets received by the I/O adapter 104 and generates one or more tasks within network processor 100 corresponding to the multicast packet. As described herein, a task may refer to respective data packet (or a copy of the data packet that is multicast). The multicaster module 228 is configured to be implemented as software, hardware, firmware, combinations thereof, or the like. The one or more tasks are provided to one or more processing modules (e.g., engines) of network processor 100 via task ring interface 218.

It is contemplated that within the network processor 100 that the protocol data units (PDUs) for a respective layer (e.g., a layer 3 PDU data packet, etc.) may share one or more blocks of data within a buffer 212, such as the blocks of data described below and illustrated in FIG. 4B. Thus, a block of data may be 64 B in size. However, the block of data may be utilized in 16 B increments (i.e., there are four (4) subsets (e.g., chunks) of 16 B data within the 64 B block of data). Thus, a first PDU data packet may utilize a first subsection of the block of data, and a second PDU data packet may utilize a second subsection of the block of data (i.e., multiple PDUs potentially share the same block of data).

FIG. 2 shows a multicaster module 228 in the I/O interface 104 of FIG. 2 in accordance with example embodiments of the present disclosure. As described above, the network processor 100 supports multiple tasks (e.g., a set of multicast data packet copies) to allow the network processor 100 to transmit a copy of a data packet to multiple destinations). In other words, multiple tasks may be created within the network processor 100 and each task includes a refcnt, as described in greater detail below, and is associated with a data packet stored in memory. Thus, a task corresponds to a set of data packet copies that are configured to be multicast within the network processor 100.

It is understood that the multicaster module 228 can be employed to support multicast packets (i.e., a set of data packet copies) in one or more other of the hardware accelerators 108 in the network processor 100. In some embodiments of the present disclosure, the multicaster module 228 is configured to replicate a data packet (i.e., create a set of data packet copies or create multiple tasks) as required for multicasting purposes. For example, the module 228 is configured to replicate the data packet to create a set of data packet copies to be multicast. For efficiency of storage of data packet, the data packet may be stored in blocks of memory (e.g., within the buffer 212 and/or the system memory 120). Thus, in some instances of the present disclosure, sub-sets of data are stored within multiple fixed blocks of system memory 120 and/or the buffer 212. One or more blocks of system memory 120 and/or the buffer 212 may be utilized to fully or partially store the data packet. It is understood that the blocks of memory may not be contiguous blocks of memory. The multicaster module 228 is configured to maintain a linked list (see linked list 408 in FIG. 4B) to indicate locations within the blocks of memory, such as within the buffer 212, that store the portions of the task or tasks. For example, the module 228 is configured to maintain a first linked list for linking the blocks storing a first single data packet copy and a second linked list for linking the blocks that store a second single data packet copy (and so forth).

Figure 3:
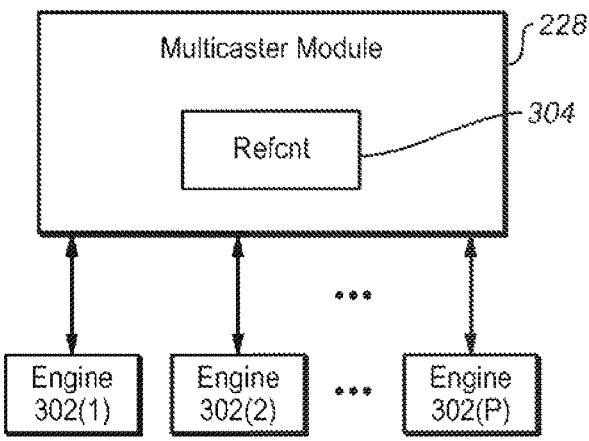
FIG. 3 is a block diagram illustrating a multicaster module residing within the I/O adapter, and the multicaster module is configured to multicast a plurality of data packets to a plurality of engines in accordance with an example implementation of the present disclosure.

FIG. 3 illustrates the multicaster module 228 transmitting a data packet to multiple engines 302(1) to 302(P), where P is an integer defining how many engines 302 are within the network processor 100. As shown, the multicaster module 228 is configured to also maintain a reference count (refcnt) 304 that is utilized to determine when the multicaster module 228 can deallocate (e.g., remove the respective linked list or identify the corresponding buffer 212 within the free list) the memory storing the data packet copy (i.e., the data packet no longer needs to be stored within memory as the multicasting operation pertaining to that data packet is complete). The initial refcnt 304 is initially set to a maximum possible value that the data packet could be multicast minus one (1), as set forth in EQN. 1:

$$\text{maximum possible multicast value} - 1 \qquad \text{EQN. 1.}$$

As described in greater herein, the module 228 is configured to modify a refcnt decrement value within each data packet within the set of data packet copies prior to transmission of the respective data packet copy.

Figure 4A:
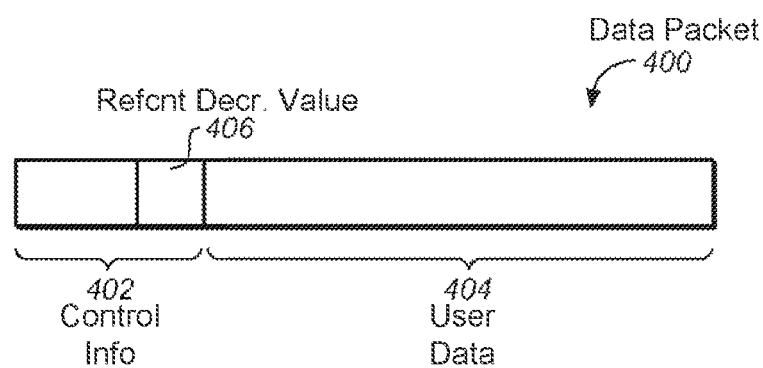
FIG. 4A illustrates an example copy of a data packet (e.g., datagram) structure (i.e., a "task") in accordance with an example implementation of the present disclosure.
Figure 4B:
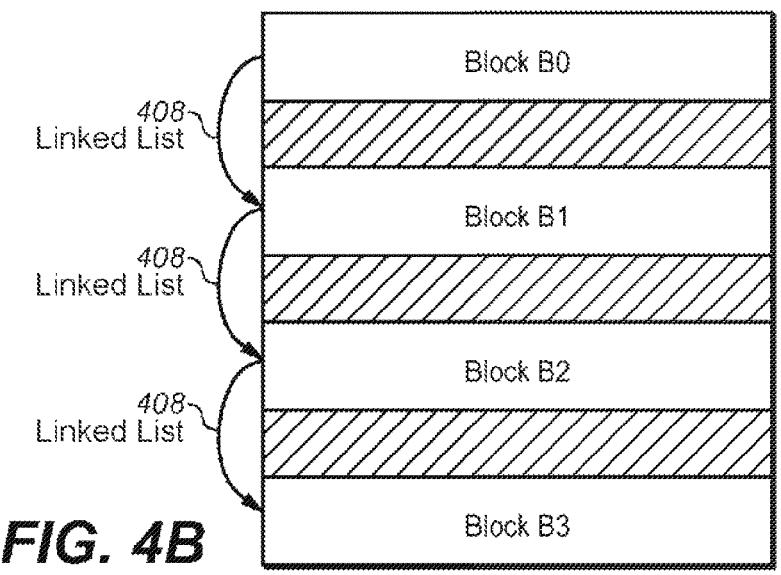
FIG. 4B illustrates blocks of memory connected together via a linked list, where the blocks of memory as illustrated are storing data to be transmitted via multicast data packets.

FIG. 4A illustrates an example implementation of a copy of a data packet structure (e.g., a block of a data packet), or a task, in accordance with the present disclosure. As shown, each copy of the data packet 400 includes a control information (e.g., data) 402 portion and a data 404 portion. The control information 402 comprises data that is utilized to identify the destination for the data 404. For example, the control information 402 may include, but is not limited to: data representing source and/or destination addresses, data representing error detection codes, data representing sequencing information, and so forth. The data 404 portion of the data packet 400 refers to the portion of the data that comprises the purpose of the transmission (e.g., the "payload" portion of the data packet 400). In an implementation of the present disclosure, the control information 402 may be positioned at the beginning of a block of data being stored or transmitted (e.g., the "header" portion of the data packet 400). In another implementation of the present disclosure, the control information 402 may be positioned at the end of the block of data being stored or transmitted (e.g., the "trailer" portion of the data packet 400). It is understood that data packet may refer to any block of data that is transmitted within the network processor 100. Thus, the term data packet may comprise any formatted unit (e.g., block) of data that includes a control information 402 portion and a user data 404 portion. As shown, the control information 402 includes a refcnt decrement value 406 that indicates an amount to decrement the refcnt 304. In one or more embodiments of the present disclosure, the module 228 maintains a refcnt 304 for each block of data to be transmitted.

For every copy of the data packet 400 (or set of data packet 400 copies) to be transmitted by the multicast module 228 to a subset of engines 302, the refcnt decrement value 406 is set to one (1). In an implementation of the present disclosure, a subset of engines 302 is defined as the number of engines (P) minus 1. In this example, the refcnt decrement value 406 of the data packets 400 to be transmitted to engine 302(1) through engine 302(P−1) is set to one (1). The refcnt decrement value 406 of the data packet 400 copy to be transmitted by the module 228 to the last engine 302 (e.g., engine 302(P) is set to the maximum multicast value minus the number of times the data packet copy is to be multicast, as set forth in EQN. 2:

$$\text{initial refcnt value} - \text{\# of times to be multicast} \qquad \text{EQN. 2.}$$

For example, a maximum multicast value may be set at two hundred and fifty-six (256). A first set of data packets 400 is required to be multicast ten (10) times, and the first set of data packets 400 are stored within four (4) blocks of memory (i.e., the module 228 maintains a linked list 408 to the four blocks of data B0, B1, B2, and B3 that comprises the data for the first set of data packet 400 copies as shown in FIG. 4B). Thus, the data stored within each block B0, B1, B2, B3 is transmitted to the destination engines 302 (e.g., engines 302(1) to 302(10) in this example). In some embodiments, four data packets 400 having data that correspond to a respective data block are transmitted It is understood that the block size is given for simplicity purposes only and that the block size may vary in practice (e.g., block size may be approximately ten thousand (10K) bytes).

In one or more embodiments of the present disclosure, the decrement value 406 is dependent upon whether PDUs share the block of data, which was described in greater detail above. For example, if the PDUs do not share the block of data, the decrement value 406 is set to the number of subsections within the data block (except for the last data packet 400 copy to be multicast), and the initial refcnt 304 is set to:

of chunks*maximum# to multicast　　　　EQN. 3.

In this example, the decrement value 406 is set to four (4), or the number of chunks, or subsections) with the block of data. The decrement value 406 of the last data packet 400 copy to be multicast is set to:

of chunks*(maximum# to multicast−# of times to be multicast+1)　　　　EQN. 4.

If the PDUs share the block of data, the decrement value 406 is set to the number of chunks of the block of data used. The number of chunks used is based upon the amount of data within the block (i.e., =1 if<=16 B; =2 if<=32 B; =3 if<=48 B; =4 if>48 B). The decrement value 406 of the last data packet 400 copy to be multicast is set to:

of chunks used*(maximum# to multicast−# of times to be multicast+1)　　　　EQN. 5.

When the data that comprises the copy of the data packet 400 is transmitted to the engines 302(1) through 302(9), the refcnt decrement value 406 within the respective control information 402 is set to one (1). Thus, the refcnt decrement value 406 for the data packets corresponding to data stored within blocks B0, B1, B2, B3 transmitted to engines 302(1) through 302(9) are each set to one (1). The refcnt decrement value 406 for the last copies within the set of data packets corresponding to the data stored in blocks B0, B 1, B2, B3 (as shown in FIG. 4B) to be transmitted (i.e., the data packet to be transmitted to engine 302(10)) is set to two hundred and forty-six (246). When each of the respective engines 302 has completed operation on the respective data packet 400, each engine 302 causes the refcnt 304 to be decremented by the corresponding refcnt decrement value 406. In the above example, once engine 302(10) has completed operations with respect to the received data packet 400, the engine 302(10) causes (e.g., transmits an indication to the multicaster module 228) the corresponding refcnt 304 to be decremented by two hundred and forty-six (246) to cause the refcnt 304 for the corresponding data block to be set to nine (9). Thus, each of the remaining engines 302 (i.e., engine 302(1) to engine 302(9)) causes the refcnt 304 to decrement by one (1). In one or more embodiments, the respective engines 302 may cause transmission of a data packet (i.e., an indication) to the module 228 to cause the module 228 to decrement by the refcnt decrement value 406. For instance, the data packet copy may include control information that comprises data to instruct the module 228 to decrement the module 228 and the payload comprises the respective decrement value. However, other configurations are possible. Once the refcnt decrement value 406 is set to zero, the module 228 is configured to deallocate (e.g., delete, or remove, the linked list that indicates the locations of each block of data in memory) the corresponding memory blocks utilized to store the blocks of data that comprise the data packet 400. In other words, the MMB is configured to update the free list to indicate that the corresponding buffer 212 can be utilized by the engines 302. The refcnt decrement value 406 is then re-set to the default multicast value described above (i.e., two hundred and fifty-five in the above-described example).

It is understood that the engines 302 may receive the set of data packet 400 copies in any given order, and thus, each data packet 400 copy may be read in any given order. Thus, some engines 302 may read each data packet copy corresponding to the data stored within the blocks (e.g., blocks B0 through B3) faster with respect to other engines 302. As described above, a separate refcnt value 304 is maintained by the module 228 for every block of the data packet 400 copy that is transmitted. In other words, a refcnt value 304(1) is maintained for every block of data that is transmitted to the engine 302(1), a refcnt value 304(2) is maintained for every block of data that is transmitted to the engine 302(2), a refcnt value 304(3) is maintained for every block of data that is transmitted to the engine 302(3), and so forth. The refcnt value 304 is maintained for every block of data in the event an engine 302 completes operations (e.g., reading of the data) on the transmitted blocks of data before another engine 302 completes its respective operations on the transmitted blocks to mitigate the opportunity of data corruption (e.g., premature deallocation of memory, etc.).

Figure 5:
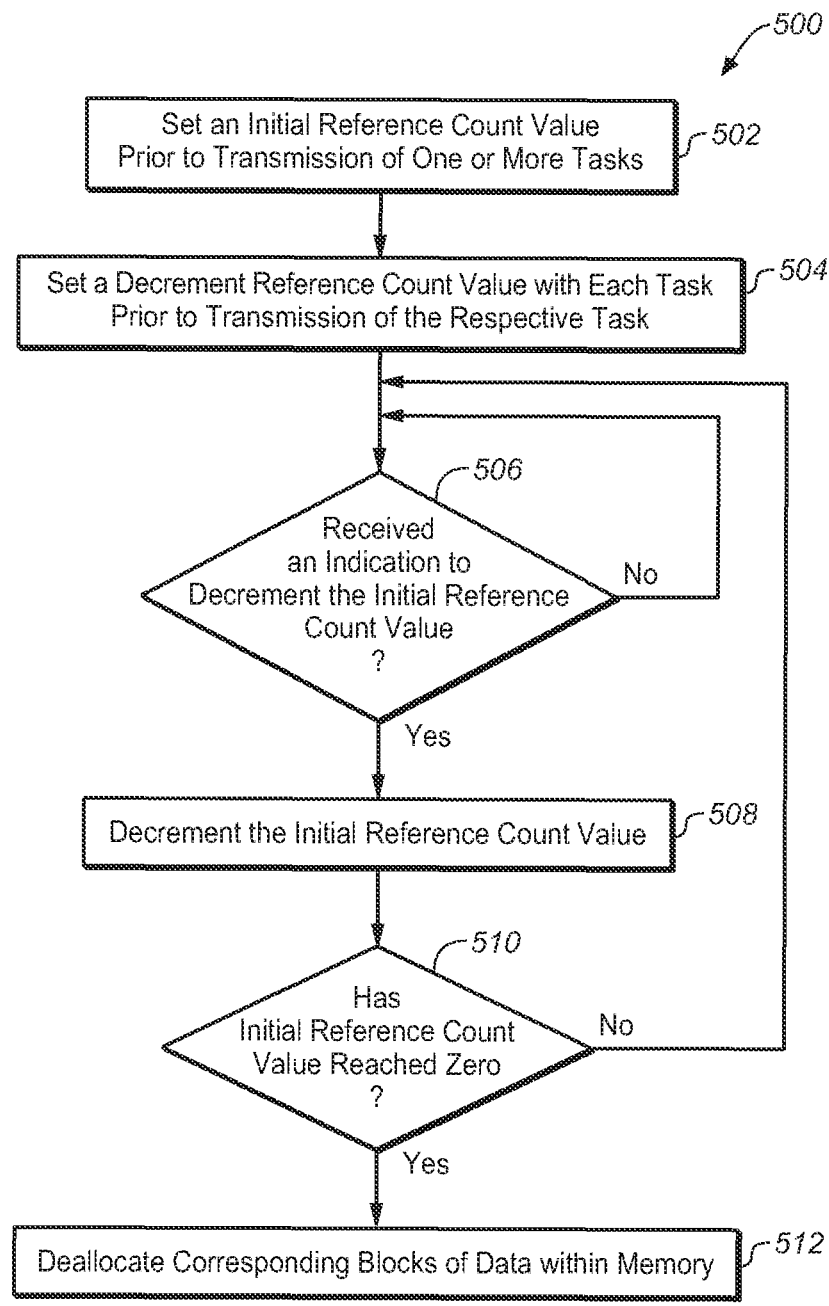
FIG. 5 is a method diagram for multicasting data packets within a network processor, such as the network processor illustrated in FIG. 1, in accordance with the present disclosure.

FIG. 5 depicts a method 500 in an example embodiment for transmitting a set of data packet copies (i.e., multiple tasks) according to a multicasting protocol in accordance with the present disclosure. As shown, an initial reference count value is set (e.g., determined) prior to transmission of one of more tasks (Block 502). As described above, the initial reference count (refcnt) value 304 is set to the maximum possible value of the multicast count minus one (1) (see EQN. 1). It is understood that the initial refcnt value (1) may be a large value as the number of times a copy of a data packet to be multicast may be large. An initial refcnt value 304 for every data packet copy to be transmitted is maintained by the multicaster module 228.

As shown in FIG. 5, a decrement reference count value is set within each data packet copy prior to transmission of the respective task (Block 504). The multicaster module 228 is configured to set a decrement refcnt value 406 within the control information 402 of each data packet 400 copy (i.e., task). As described above, the decrement refcnt value 406 is set to one (1) for every set of data packet 400 copies to be transmitted to a subset of destination engines 302 (i.e., engine 302(1) through engine 302(P−1). The decrement refcnt value 406 for the set of data packet 400 copies to be transmitted to the engine 302(P) is set to the refcnt value 304 minus the number of times the set of data packets 400 are to be multicast (see EQN. 2).

A determination is made of whether an indication to decrement the initial reference count value was received (Decision Block 506). The multicaster module 228 is configured to continually query whether an indication (e.g., signal or data packet) has been received to decrement the corresponding refcnt value 304. For example, once the respective engine 302 has completed operations (e.g., reading) with respect to the received data packet 400 copy, the engine 302 transmits a an indication to the multicaster module 228 to decrement the corresponding refcnt value by the respective data packet's (i.e., task's) decrement refcnt value 406, which was described in greater detail above. If no indication to decrement has been received, the query continues (NO from Decision Block 506). If an indication to decrement has been received (YES from Decision Block 506), the initial reference count value is decremented (Block 508). As described above, the module 228 is configured to decrement the refcnt value 304 by the corresponding decrement value transmitted with the corresponding data packet 400 copy.

As shown in FIG. 5, a determination is made of whether the initial reference count value has reached zero (Decision Block 510). If the refcnt value for the corresponding data packet has not reached zero (NO from Decision Block 510), the multicast module continues to query to determine whether an indication to decrement has been received. If the refcnt value for the corresponding task, or copy of the data packet, has reached zero (YES from Decision Block 510), the blocks of memory storing data for the corresponding task is deallocated (Block 512). For example, once the multicast module 228 determines that the refcnt value 304 for a corresponding data packet 400 has reached zero, the module 228 is configured to deallocate (i.e., the corresponding portion of the buffer 212 is free to be utilized again) the blocks of memory that are storing the data for the corresponding data packet 400. For instance, the MMB is configured to put the corresponding buffer 212 into the free list to indicate that the buffer 212 is available to be utilized again by an engine 302.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims

The invention claimed is:

1. One or more non-transitory, computer-readable media having stored therein a plurality of instructions that, when executed, cause a network processor to:
   parse a plurality of data packet copies, wherein the plurality of data packet copies include a control data portion and a data portion;
   set a reference count value prior to multicast transmission a plurality of data packet copies;
   set a decrement reference count value within the control data portion of each one of the plurality of data packet copies;
   determine whether an indication to decrement the reference count value has been received from one or more engines, the one or more engines configured to process one or more of the plurality of data packet copies;
   decrement the reference count value by the decrement reference count value after the indication is received, wherein the indication includes the decrement reference count value; and
   deallocate a corresponding block of memory when the reference count value is zero, the block of memory configured to store data representing the data multicast within the plurality of data packet copies.

2. The one or more non-transitory, computer-readable media of claim 1, wherein the plurality of instructions, when executed, further cause the network processor to determine whether the reference count value is zero.

3. The one or more non-transitory, computer-readable media of claim 1, wherein to deallocate a corresponding block of memory comprises to delete a linked list representing positions within shared memory of the stored data.

4. The one or more non-transitory, computer-readable media of claim 1, wherein the initial reference count value comprises a maximum multicast value minus one.

5. The one or more non-transitory, computer-readable media of claim 1, wherein the reference count decrement value for a first subset of the plurality of data packet copies is one and the reference count decrement value for a second subset of the plurality of data packet copies is the maximum multicast value minus a number of times each data packet copy within the plurality of data packet copies is multicast.

6. One or more non-transitory, computer-readable media having stored therein a plurality of instructions that, when executed, cause a network processor to:
   determine a reference count value based upon a maximum multicast value of the plurality of tasks;
   set a reference count decrement value within the control data portion of the plurality of tasks, the reference count decrement value based upon the maximum multicast value; and
   decrement the reference count value by a corresponding reference count decrement value upon receiving an indication from an engine, wherein the indication represents the engine has completed operations on at least one of the plurality of tasks and wherein the indication includes the reference count decrement value.

7. The one or more non-transitory, computer-readable media of claim 6, wherein the plurality of instructions, when executed, further cause the network processor to multicast the plurality of tasks to one or more engines.

8. The one or more non-transitory, computer-readable media of claim 6, wherein the initial reference count value comprises the maximum multicast value minus one.

9. The one or more non-transitory, computer-readable media of claim 6, wherein the reference count decrement value for a first subset of the plurality of tasks is one and the reference count decrement value for a second subset of the plurality of data packets is the maximum multicast value minus a number of times each task within the plurality of tasks is multicast.

10. The one or more non-transitory, computer-readable media of claim 9, wherein the first subset of the plurality of tasks is P minus one (P−1), where P is an integer value that represents a total number of tasks that comprises the plurality of tasks.

11. The one or more non-transitory, computer-readable media of claim 6, wherein the plurality of instructions, when executed, further cause the network processor to maintain a linked list that represents a position of one or more blocks of data, wherein the one or more blocks of data includes data multicast within the plurality of tasks.

12. The one or more non-transitory, computer-readable media of claim 11, wherein the plurality of instructions, when executed, further cause the network processor to deallocate the one or more blocks of data when the reference count value reaches zero.

13. The one or more non-transitory, computer-readable media of claim 6, wherein the control data portion comprises a header portion of each one of the plurality of tasks.

14. One or more non-transitory, computer-readable media having stored therein a plurality of instructions that, when executed, cause a network processor to:
   parse a plurality of data packet copies, wherein the plurality of data packet copies include a control data portion and a data portion;
   determine a reference count value based upon a maximum multicast value of the plurality of data packet copies;
   set a reference count decrement value within the control data portion of the plurality of data packet copies, the reference count decrement value based upon the maximum multicast value;
   decrement the reference count value by a corresponding reference count decrement value in response to receipt of an indication from an engine, wherein the indication represents the engine has completed operations on at least one of the plurality of data packet copies and wherein the indication includes the reference count decrement value; and
   deallocate memory storing one or more blocks of data when the reference count is zero, wherein the one or more blocks of data represents data multicast within the plurality of data packet copies.

15. The one or more non-transitory, computer-readable media of claim 14, wherein the plurality of instructions, when executed, further cause the network processor to multicast the plurality of data packet copies to one or more engines.

16. The one or more non-transitory, computer-readable media of claim 14, wherein the initial reference count value comprises the maximum multicast value minus one.

17. The one or more non-transitory, computer-readable media of claim 14, wherein the reference count decrement value for a first subset of the plurality of data packet copies is one and the reference count decrement value for a second subset of the plurality of data packet copies is the maximum multicast value minus a number of times each data packet copy within the plurality of data packet copies is multicast.

18. The one or more non-transitory, computer-readable media of claim 17, wherein the first subset of the plurality of data packet copies is P minus one (P−1), where P is an integer value that represents a total number of data packet copies that comprises the plurality of data packet copies.

19. The one or more non-transitory, computer-readable media of claim 14, wherein the plurality of instructions, when executed, further cause the network processor to maintain a linked list representing a position of one or more blocks of data, wherein the one or more blocks of data includes data multicast within the plurality of data packet copies.

20. The one or more non-transitory, computer-readable media of claim 14, wherein the control data portion comprises a header portion of each one of the plurality of data packet copies.

* * * * *